United States Patent [19]

Cogan et al.

[11] Patent Number: 4,938,571
[45] Date of Patent: Jul. 3, 1990

[54] SOLID STATE ELECTROCHROMIC LIGHT MODULATOR

[76] Inventors: Stuart F. Cogan; R. David Rauh, both of 111 Downey St., Norwood, Mass. 02062

[21] Appl. No.: 207,496

[22] Filed: Jun. 16, 1988

Related U.S. Application Data

[63] Continuation-in-part of Ser. No. 64,069, Jun. 18, 1987.

[51] Int. Cl.$^5$ .............................................. G02F 1/17
[52] U.S. Cl. ................................................. 350/357
[58] Field of Search ......................... 350/357, 353, 355

[56] References Cited

U.S. PATENT DOCUMENTS

| | | | |
|---|---|---|---|
| 4,294,520 | 10/1981 | Inoue et al. | 350/357 |
| 4,465,339 | 8/1984 | Baucke et al. | 350/357 |
| 4,482,216 | 11/1984 | Hashimoto et al. | 350/357 |
| 4,504,120 | 3/1985 | von Alpen et al. | 350/357 |
| 4,569,774 | 2/1986 | Forbus, Jr. | 252/33 |
| 4,632,516 | 12/1986 | Ishiwata | 350/357 |
| 4,663,420 | 5/1987 | Chang | 528/168 |
| 4,726,664 | 2/1988 | Tada et al. | 350/357 |
| 4,750,817 | 7/1988 | Sammells | 350/357 |
| 4,824,222 | 4/1989 | Green | 350/357 |

FOREIGN PATENT DOCUMENTS

| | | | |
|---|---|---|---|
| 8105126 | 6/1983 | Japan | 350/357 |
| 1240225 | 10/1986 | Japan | 350/357 |

*Primary Examiner*—Eugene R. LaRoche
*Assistant Examiner*—Nathan W. McCutcheon
*Attorney, Agent, or Firm*—Fish & Richardson

[57] ABSTRACT

An all solid-state variable transmission electrochromic device has a source of charge compensating ions. An inorganic oxide counterelectrode film which on reduction with the accompanying insertion of the charge compensating ions increases its transmission of light of predetermined wavelength is separated from a primary electrochromic film which on reduction with the accompanying insertion of the charge compensating ions decreases its transmission of light of predetermined wavelength by an insulating electrolyte film that transports the charge compensating ions. First and second electrodes are contiguous with the inorganic oxide counter electrode film and the primary electrochromic film, respectively, and separated by the three films.

13 Claims, 2 Drawing Sheets

SOLID STATE ELECTROCHROMIC LIGHT MODULATOR

This invention was made with Government support under Contract No. DE-AC03-87SF16733 awarded by the Department of Energy. The Government has certain rights to this invention.

This application is a continuing application of U.S. Application Ser. No. 64,069 filed June 18, 1987, of Stuart F. Cogan entitled Light Modulating Device.

This invention relates to electrochromic devices for modulation of light transmission.

Electrochromic materials are materials whose optical properties can be reversibly altered in response to an applied potential in a process involving the simultaneous insertion or extraction of electrons and charge compensating ions. These materials have been used, e.g., in display devices, variable reflectance mirrors, and in windows for controlling light transmission.

Prior art information displays comprising electrochromic devices typically hide the counter electrode, if one is designated, behind a light scattering material dispersed in the electrolyte. Thus, the color/bleach processes of the counter electrode do not enter into the optical display effect. Conversely, the materials and structures for variable transmittance devices depend on the optical properties of all the layers, including both the primary and counter electrode layers, as well as their complementary color/bleach behaviors during oxidation and reduction. Effective optical transmission modulation typically requires a wide dynamic range, which in turn depends on the extent to which both electrodes taken together can be bleached to achieve a high degree of transmissivity and colored to achieve a high optical density.

In a typical prior art variable transmission electrochromic device the counter electrode reaction is not defined, and, judging from the conditions of operation involving large polarizations, seem to involve the decomposition of electrolyte, which would hinder the long term stability and color/bleach reproducibility. In other prior art examples, devices utilize a weakly coloring counter electrode, which still compromises the bleached state transmittance. Several examples of prior art devices utilizing $WO_3$ in conjunction with oxidatively coloring $IrO_2$ have been described, but these devices are uneconomical for most applications.

Devices have been described in which both electrodes are initially present in their fully oxidized state. The initial coloration therefore typically involves undesirable electrolyte oxidation to depolarize the electrochemical cell. If the electrolyte contains water, then this reaction would give rise to oxygen bubble formation, disrupting the thin film structures. Some structures have been put forth utilizing liquid electrolytes, but these structures would provide formidable sealing problems for large area architectural applications. U.S. Pat. No. 4,278,329 discloses prereduction of the primary electrochromic layer in liquid electrolytes.

Prior art devices in which the counter electrode is an electrochromic organic polymer, such as polyaniline, generally suffer from sensitivity to irreversible oxidation processes over long term operation. In one example of prior art (U.S. Pat. No. 4,294,520), an electrochromic display device is disclosed which comprises a vapor deposited layer of an electrochromic material and a contiguous layer comprising chromium (III) oxide and the oxide of a transition metal or silicon, sandwiched between a pair of electrodes at least one of which is light transmitting. Such a device is deficient in relying on electrolysis of water of hydration in the layers to produce the hydrogen inserted form of one of the layers in the first polarization cycle. Furthermore, this dehydration continues over subsequent cycles if the voltage is not carefully controlled to avoid water electrolysis, resulting in eventual deceleration of device response, or necessitating increased polarizations, which exacerbates the problem. In addition, this device has no well-defined electrolyte layer. Hence some current occurs as direct electronic current through the structure, making it difficult to control the state of coloration by the applied voltage or duration of current flow. Such electronic current creates an internal short circuit of the device, causing the coloration to fade under open circuit.

Accordingly, an object of the present invention is a variable transmission electrochromic device with high dynamic range, open circuit memory and longevity, such advantages being realized by counter electrode materials with low residual reduced state coloration and with a long cycle life.

Another object of this invention is a device with controllable, reproducible optical modulation and dynamic range, such features rendered possible by preparing one or both electrodes with a known state of reduction during device assembly.

According to the invention there is a composite whose transmittance may be varied in response to an applied electrical potential. The composite includes a variably transmissive electrochromic layer that is normally colorless, but when reduced by the insertion of an electron and charge compensating ion becomes colored by absorption, reflectance or a combination of both. The composite also includes a second electrochromic layer, a counter electrode, which is colored when oxidized and colorless when reduced, thus forming a complement with the first electrochromic layer. The oxidation and reduction of the counter electrode occurs by electron injection and insertion of the same charge compensating ion as the first electrochromic layer. The charge compensating ions are transported by an ion conducting but electron blocking layer, such as an electrolyte, separating the two electrochromic layers.

The transmittance of the composite is at a maximum when the first electrochromic layer is fully oxidized and the counter electrode is fully reduced, while it is at a minimum when the first electrochromic layer is fully reduced and the counter electrode is fully oxidized. The transmittance is changed by applying a voltage across the composite such that a current flows changing the oxidation state of the two electrochromic layers.

In preferred embodiments, both the primary electrochromic element and the counter electrode are in the form of thin films. The primary electrochromic element is tungsten trioxide, which becomes either blue (light absorbing) or blue-bronze (light absorbing/reflecting) on reduction with compensating ion insertion, depending on its degree of crystallinity. The preferred insertion ion is $Li^+$, due to its relatively high mobility in tungsten oxide. $Li^+$ is preferred over $H^+$ because $H^+$ can also participate in a side reaction forming $H_2$ gas, which is undesirable.

The ion conducting element must transport insertion ions, such as $Li^+$, and must be transparent over the optical range being modulated. Examples of suitable ion conducting materials are LiNbO$_3$ and mixtures of poly-N-vinyl pyrrolidone and polyethylene glycol doped with LiClO$_4$.

The counter electrode material has the general formula A$_x$(MO), where MO is a mixture of vanadium oxide or chromium oxide together or with oxides of one of the following metals: Nb, Ti or Ta; and A is an atom identical to the insertion ion in the primary electrochromic layer and the transported ion in the electrolyte. The mixed oxides have superior reduced state visible light transmission to V$_2$O$_5$ and may be oxidized and reduced with Li$^+$ insertion many times, reversibly, without loss of activity or without change in optical properties. Copending application Ser. No. 64,069 filed 18th June of 1987, entitled LIGHT MODULATING DEVICE discloses V$_2$O$_5$.

The electrical potential and electron current flow are supplied through a pair of electrodes. Where the device is used for transmittance modulation, both electrodes are transparent over the optical range being modulated. Tin-doped indium oxide (ITO) is a suitable transparent thin film electrode material. Where the device is used for reflectivity modulation, one electrode is transparent while the other is reflective over the optical range being modulated. Examples of reflective materials include aluminum, nickel, or gold.

A general equation representing the operation of the invention in which WO$_3$ is the primary electrochromic layer can be written as:

$$bWO_3 + A_x(MO) \longleftrightarrow bA_{(x/b)}WO_3 + MO$$
Bleached State          Colored State Here, b denotes that the two electrode materials need not be present in any special molar ratio. The degree to which the counter electrode MO is reduced in the bleached state is given by the stoichiometric parameter x. Coloration is accomplished by the transfer of A from MO to WO$_3$. Thus, assuming that MO is the limiting electrode and that therefore sufficient WO$_3$ is present to accept all of the available A, the dynamic optical range of the device may be determined by the amount of A present.

The inserting species, A, must be introduced during fabrication. This can be accomplished by several methods, including direct vapor deposition of A$_x$(MO), reduction of MO by elemental A in a separate steps, or electrochemical reduction of the MO layer in an electrolytic solution of A$^+$. Alternatively, A may be introduced initially into the primary electrochromic layer (WO$_3$ in the above equation) using similar methods; or A may be distributed between both electrodes by the same means, the resulting as-fabricated structure being in some intermediate state of coloration.

Dynamic range of the device will degrade if some irreversible process consumes A during device operation, such as H$_2$ gas formation if A=H, or a phase transformation in one of the electrode materials. The reversibility of H and Li insertion/extraction in WO$_3$ is well-known. The preferred counter electrodes, MO, in this invention also have high reversibility, so that the device may be cycled many thousands of times without optical degradation.

When the device is colored on the first cycle, the A species may be derived from an irreversible electrochemical decomposition of the electrolyte, if it was not introduced initially into the counter electrode. Typically this A-species is hydrogen, produced by electrolysis of water comprising or trapped in the electrolyte. Controlling the quantity of A in the device facilitates fabricating the device with a reproducible and knowable dynamic range.

Other features, objects and advantages of the invention will be apparent from the following detailed description and appended claims when read in connection with the accompanying drawings, in which:

Figure 1:
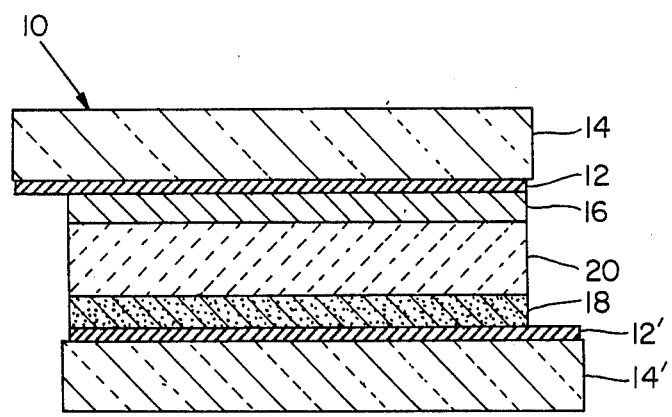
FIG. 1 is a fragmentary cross-sectional view of an electrochromic device embodying the invention incorporating a polymeric or semi-solid gel electrolyte.

With reference now to the drawings and more particularly FIG. 1, there is shown a device 10 for modulating transmittance or reflectivity, and which employs a polymer electrolyte to impart a "safety glass" configuration. Device 10 has a pair of electrodes 12 and 12' connected to a conventional dc current source (not shown), each deposited onto a transparent substrate, 14 and 14'. Substrate 14 is typically glass, but may also be a flexible plastic film (e.g., mylar), or a rigid plastic sheet (e.g., polyacrylic). Where device 10 is used for infrared optical modulation, suitable infrared-transparent materials for substrate 14 include ZnSe, ZnS, Si, Ge, glasses of metal fluorides, and sheets of organic polymers sufficiently thin to have a low absorption cross section over the integrated infrared spectrum.

Electrodes 12 and 12' are both transparent over the optical range being modulated when transmittance modulation is desired. Examples of suitable electrically conductive, optically transparent materials include ITO, fluoride-doped tin oxide, and doped ZnO. When reflectivity modulation is desired, one of the electrodes may be made optically reflective over the desired wavelength range, and is typically a metal such as aluminum, stainless steel, nickel, gold or silver. Preferred transparent and reflective electrode materials are ITO and Ni, respectively. The thicknesses of both electrodes 12 and 12' are preferably within the range 0.05–1.0 µm, preferably 0.2 µm. They are deposited as thin films using conventional vacuum deposition techniques, e.g., sputtering.

Layers 16 and 18 are deposited onto layers 12 and 12' also as thin films, preferably by sputtering. Layer 16 is the counter electrode and layer 18 is the primary electrochromic element. Layer 18 is an electrochromic material which in its fully oxidized state is transmissive over the modulated wavelength range and which becomes absorbing and/or reflecting over the same range when reduced. Examples of suitable materials for layer 18 include WO$_3$, MoO$_3$, and mixtures thereof. The preferred material is WO$_3$. Layer 16 is a mixed oxide of a material such as vanadium or chromium, either together or with an oxide of Nb, Ta, or Ti. The mixed oxides of layer 16 preferably have the following properties:

1. Like the primary electrochromic layer 18, they can be reversibly reduced electrochemically by adding electrons and charge compensating ions (e.g., H$^+$, Li$^+$, Na$^+$, K$^+$, Ag$^+$, Cu$^+$).

2. In their fully reduced state, they are transmissive over the wavelength range of modulation.

3. As they become oxidized, they decrease their transmission over the wavelength range of modulation.

Layers 16 and 18 are separated by an electrolyte layer 20 for transporting ions between layers 16 and 18. Layer 20 is transparent over the wavelength range being modulated. It allows ion conduction but not electron conduction or tunnelling between layers 16 and 18. Layer 20 is a polymer or semi-solid gel electrolyte in the present embodiment, preferably polymer, and is preferably within the range 1 to 1000 μm thick, preferably 50 μm. Layer 20 may either conduct protons or one of the possible inserting metal ions listed above. Because of their high mobilities in candidate materials for layers 16, 18 and 20, $Li^+$ and $H^+$ are preferred. Suitable materials for layer 20 include $Li^+$ conducting polymers, e.g. poly(bis-methoxyethoxyethoxide) polyphosphazine (MEEP) or mixtures of polyethylene glycol and N-methyl pyrrolidone, either doped with $LiCF_3SO_3$ or other suitable Li salt. Where layer 16 is compatible with protic acid electrolytes, as in mixed oxides of vanadium and niobium for example, then a proton conducting polymer may be used for layer 20. Possible proton conducting polymers include poly-2-acrylamido-2-methylpropane sulfonic acid (polyAMPS), and perfluorinated sulfonated ionomers such as Nafion. Layer 20 may be sputtered from a composite target of 42% $Li_2O$, 26% $SiO_2$ and 32% $ZrO_2$.

Prior to assembly of the device, either layer 16 or 18 may be converted to its fully reduced form. This may be accomplished electrochemically by reduction in a nonaqueous $Li^+$ electrolyte if the Li-inserted form is to be used with a $Li^+$ conducting electrolyte or by reduction in a protic electrolyte if a proton conducting electrolyte is to be used. It may also be accomplished chemically by treating either layer with a suitable reducing agent, e.g., n-butyl lithium for Li insertion, or aqueous $S_2O_4^=$ for the H-inserted form. Alternatively, it may be accomplished by vacuum processing in a separate step, such as sputtering from a Li target or a target which decomposes to give Li atoms in the vapor phase, or exposing to an $H_2$ plasma for H-insertion. Further, the layer may be produced by vapor deposition of the reduced material directly using a source or target of the desired composition, or a reducing reactive atmosphere to transform the source or target to the desired composition during the deposition process.

The above procedure enables the device to be assembled with one electrode in fully oxidized state and the other fully reduced, which would represent either the extreme colored or extreme bleached state of the device. Alternatively, layers 16 and 18 may be prepared in some intermediate state of oxidation, e.g., by shorting out fully oxidized and fully reduced layers in the presence of electrolyte prior to assembly. This procedure reduces the chemical activity of either layer, rendering either less susceptible to chemical reaction during the assembly procedure.

The structures are assembled by laminating layer 20 between the substrates coated with contiguous layers 12 and 16 on one substrate and 12' and 18 on the other.

In operation, layers 12 and 12' are connected to an external current source. If electrons are supplied through layer 12, layer 16 will become reduced, with the accompanying insertion of a charge compensating cation from the electrolyte. Simultaneously, electrons will be withdrawn from layer 18, with the accompanying expulsion of a charge compensating cation into the electrolyte. The electrolyte conducts ions from layer 18 to layer 16. If the polarity of the current is reversed, layer 18 and layer 16 become oxidized and reduced, respectively, and the flow of charge compensating cations through the electrolyte is reversed in direction. When all of the charge compensating ions from layer 16 have been transferred to layer 18, or when layer 18 is reduced as far as possible and has accepted as many charge compensating ions as possible, the device is in its fully colored state. Similarly, the device is in its fully colorless state when the maximum charge compensating ions have been transferred from layer 18 to layer 16.

Since device 10 has a well-defined relationship between voltage and state of charge, a voltage may be imposed between 12 and 12' and a current be allowed to flow to adjust to that voltage difference, the resulting transmittance being predictable from that voltage difference alone. This feature of truly reversible electrochromic devices allows for simplified control electronics, especially with the relationship between transmittance and voltage difference.

Figure 2:
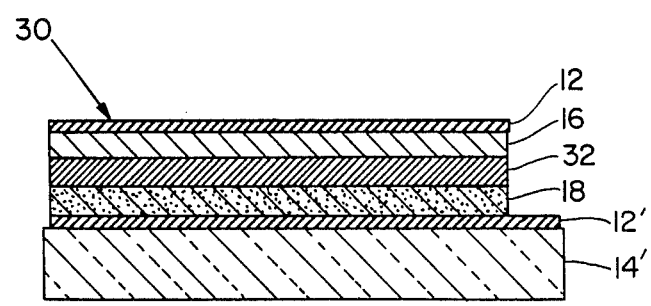
FIG. 2 is a fragmentary cross-sectional view of another embodiment of the device with a solid electrolyte and all thin film construction.

Referring to FIG. 2, there is shown a device substantially similar to that of FIG. 1, but with a thin film solid electrolyte, 0.01 to 10 μm thick, preferably 0.1 μm. This device comprises a multilayer thin film stack. Corresponding reference symbols identify identical elements in FIGS. 1 and 2. Device 30 is prepared by sequential deposition of the layers by thin film processes, preferably vacuum sputtering. The solid electrolyte 32 is a ceramic which conducts ions, but not electrons. Suitable $Li^+$ conductors for layer 32 are ternary mixtures of $Li_2O$, $ZrO_2$ and $SiO_2$, and simple compounds of Li which behave as electrolytes, such as $LiNbO_3$, $LiTaO_3$, $Li_3N$, $LiI$, $Li_2WO_4$ and $LiAlF_4$, and variants and mixtures thereof. Suitable proton conductors are partially hydrated electronically insulating inorganic oxides or fluorides, such as $SiO_2$, $Al_2O_3$, $Ta_2O_5$, $Nb_2O_5$, and $MgF_2$. The device in FIG. 2 also may be made with layers 16 and 18 reversed.

In the Li-based device, one of the layers is prepared in the Li-inserted, reduced form while the other layer is prepared in the fully oxidized form. For example, $Li_xWO_3$ may be prepared by sputtering from a $Li_2WO_4$ target in a reducing atmosphere, from a Li/W alloy target in a partially oxidizing atmosphere, or by sputtering metallic Li directly onto a $WO_3$ layer. In the H-based device, hyrogenated electrode layers may be produced by introducing the fully oxidized layer into a hydrogen plasma. By preparing the device in this way, the finished device will be either in its fully colored or fully bleached state, depending on whether the primary electrochromic layer 18 or the counter electrode layer 16 is initially reduced.

The operation of the embodiment in FIG. 2 is identical to that in FIG. 1.

Figure 3:
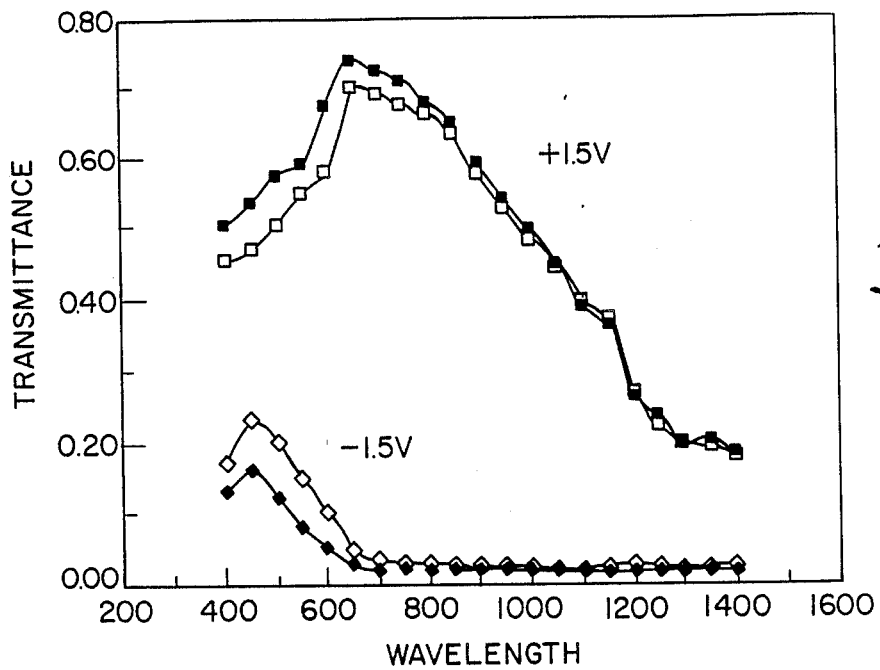
FIG. 3 shows a light transmission spectrum for the two extreme optical states of one embodiment of the device.

FIG. 3 shows a spectrum of transmittance versus wavelength for a typical structure in its two extreme states, also referred to in the examples. The difference in transmission at the wavelength of modulation between these two extreme states represents the dynamic range of the device at that wavelength. All intermediate values of light transmission within that dynamic range are possible. When any coloration state is reached, the current source may be removed and that state is retained until current is resumed in either direction.

Applications of devices 10 and 30 include windows with adjustable transmittance for glare reduction and energy efficiency, and solar panels. They can be used as light attenuators for active information displays, such as electroluminescent displays. They can be incorporated into photographic equipment, e.g., as variable grey scale filters and as lens diaphragms. If applied to reflective substrates, these devices may be used as a variable reflectance mirror, e.g., for rearview automotive mirrors. By eliminating electrolyte 32, which will allow under some conditions switching but eliminate substantial open circuit optical memory, device 30 can be used for high frequency (>1 Hz) as light modulation under the excitation of an ac electrical current. The invention may thus be useful for analog or digital modulation of optical frequency carriers.

EXAMPLES

EXAMPLE 1

The first example demonstrates the effect of increased transmittance during reduction and decreased transmittance during oxidation for two members of a group of counter electrode materials according to the invention. The effect is described by the use of coloration efficiencies which relate the optical density change ($\Delta OD$) to the quantity of lithium intercalated into the film (q, in coulombs/cm$^2$) through the equation, $$OD(\lambda) = CE(\lambda)q \tag{1}$$

where $CE(\lambda)$ is the wavelength dependent coloration efficiency. In equation (1), a negative value of q is defined to represent deintercalation of lithium (i.e., oxidation) from the electrochromic layer. A negative value of $CE(\lambda)$ represents a film which becomes increasingly transmissive during reduction with lithium.

An ITO-coated glass substrate was coated further with a thin film of the mixed oxide counter electrode material. These coatings were deposited by reactive radio frequency (rf) magnetron sputtering from a composite target of the parent metals. In this way, one counter electrode film was prepared from a mixed target containing 50 mole percent Cr and 50 mole percent V, while another was prepared from a 35:65 Nb,V target. The metal composition of the deposit reflected that of the targets, as determined by surface spectroscopic analysis. Conditions for the desired reduced-state visible transmittance were similar for both oxides: a sputter gas composition of 10% oxygen in argon was introduced into the vacuum chamber at a flow rate of 10 sccm and maintained at a total pressure of 35 µm. An rf power density of 5 watts/cm$^2$ at the metal target was employed during the deposition and the substrate was allowed to thermally equilibrate with the plasma to a typical substrate temperature of 120° C. The distance between the target and the substrate was 5 cm. A typical as-deposited film thickness is 0.15 µm, with a reversible lithium capacity of 15 mC/cm$^2$.

Figure 4:
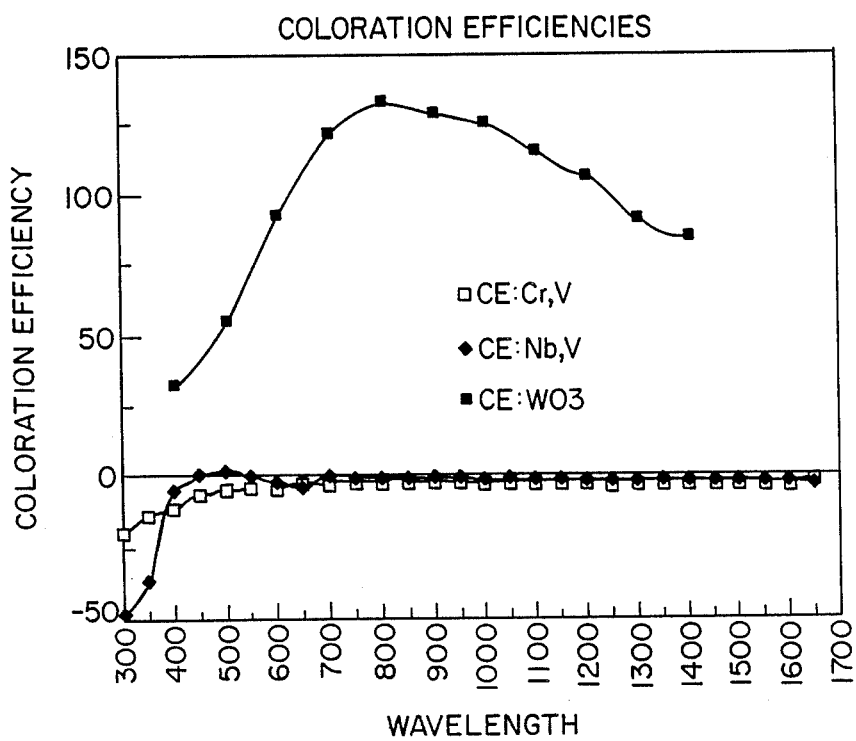
FIG. 4 shows the electrochromic coloration efficiency vs. wavelength of two suitable counter electrode materials and of tungsten oxide.

The coloration efficiencies of the films were determined as a function of wavelength by electrochemical reduction and oxidation with lithium in a spectrophotometer. The coloration efficiencies are shown in FIG. 4. The coloration efficiencies of both materials are small and negative over the entire wavelength range of interest, indicating that reduction with lithium causes them to become increasingly transmissive over a 350 to 1400 nm wavelength range. Furthermore, multicycle electrochemical reduction-oxidation testing of the mixed oxides over 20000 cycles has demonstrated that these materials undergo a large number of optical switching cycles without degradation or accompaniment of irreversible side reactions.

EXAMPLE 2

The second example comprises electrochromic light modulators employing a Li$^+$-conducting polymer electrolyte and the mixed oxide counter electrodes. The primary electrochromic layer, amorphous WO$_3$, was first deposited onto ITO-coated glass by reactive rf magnetron sputtering. A reactive sputter gas composition of 10% oxygen in argon was employed in the vacuum chamber at a flow rate of 10 sccm and maintained at a total pressure of 100 µm. The deposition was carried out at an rf power density of 5 watts/cm$^2$ at the target with a substrate to target distance of 5 cm. The temperature of the substrate was controlled by thermal equilibrium with the plasma and is typically 120° C. The deposition was carried out for a sufficient length of time that the thickness of the WO$_3$ film was 0.2 µm, and the film was capable of reversible reduction and oxidation with the alkali insertion ion to a level of 15 mC/cm$^2$.

A second ITO-coated glass substrate was coated with a counter electrode material comprised of a thin sputtered film of amorphous $(Cr_{0.5}V_{0.5})O_y$ or $(Nb_{0.35}V_{0.65})O_z$, as described in the first Example. The counter electrode film was electrochemically reduced with lithium by the double injection process (Li$^+$ and electron) in an electrolyte of 1N LiClO$_4$/propylene carbonate so that the film contains 15 mC/cm$^2$ of intercalated lithium. The resulting counter electrode film thus had the composition $Li_x(Cr_{0.5}V_{0.5})O_y$ or $Li_x(Nb_{0.35}V_{0.65})O_z$, with x approximately equal to unity in the fully reduced state. The lithium acts as the charge compensating ion during electrochemical reduction of the primary and counter electrode layers.

An electrochromic light modulator was then fabricated by laminating the substrates containing the WO$_3$ and reduced counter electrode films together with a Li$^+$ conducting polymer that is transparent over the wavelength range of desired transmittance modulation. The Li$^+$ conducting polymer in this example was a mixture of N-methyl pyrrolidone (PVP) and polyethylene glycol (PEG) doped with LiCF$_3$SO$_3$. The PVP/PEG mixture had the weight ratio of 40/60 and the ratio of LiCF$_3$SO$_3$/PVP-mer was 3:1. The application of a voltage between the ITO electrodes caused the transmittance of the light modulator to be controlled as a unique function of the applied voltage. FIG. 3 shows the transmittance spectra for the two extreme optical states of the device described with the V:Nb:O counter electrode. The device with the V:Cr:O counter electrode gave nearly identical performance. In both cases, the most transmissive state was obtained with an applied voltage of 1.5 volts with respect to the WO$_3$ layer and the least transmissive at a voltage of $-2.0$ volts with respect to the WO$_3$ layer.

EXAMPLE 3

In the third example, an all solid-state electrochromic light modulator was fabricated by sequential RF sputtering of an active electrochromic material (a-WO$_3$), an oxide-based Li$^+$ conductor (Li$_2$O.SiO$_2$.ZrO$_2$), and a V:Nb:O counter electrode as described in the previous examples. Lithium was electrochemically intercalated into the a-WO$_3$ layer and an aluminum top-contact was evaporated onto the counter electrode layer. The light modulator has the following structure, glass/ITO/a-

$Li_xWO_3/Li_2O\cdot SiO_2\cdot ZrO_2/(Nb_{0.35}V_{0.65})O_y$/aluminum

In the as-fabricated condition the light modulator exhibited a deep blue coloration and low specular reflectance when viewed through the glass side. When a potential of $-2.0$ volts with respect to the aluminum layer was applied between the aluminum and ITO contacts the $WO_3$ layer, the modulator became highly reflecting as viewed through the glass. A charge transfer of only 10 $mC/cm^2$ was required to achieve this optical modulation.

Other embodiments are within the appended claims.

What is claimed is:

1. A solid-state variable transmission electrochromic device comprising, a source of charge compensating ions, an inorganic oxide electrochromic counter electrode film composed of a mixture of at least two oxides with a first of said oxides an oxide of a metal from the group consisting of vanadium and chromium and a second of said oxides an oxide of a different metal from the group consisting of V, Cr, Nb, Ta and Ti which on reduction with the accompanying insertion of said charge compensating ions increases its transmission of light of predetermined wavelength, a primary electrochromic film which on reduction with the accompanying insertion of said charge compensating ions decreases its transmission of light of said predetermined wavelength, an insulating electrolyte film contiguous with and separating said inorganic oxide counter electrode film and said primary electrochromic film for the transport of said charge compensating ions therebetween, first and second electrodes contiguous with said inorganic oxide counter electrode film and said primary electrochromic film respectively and separated by said inorganic oxide counter electrode film, said insulating electrolyte film and said primary electrochromic film, said first and second electrodes being for receiving an electric potential therebetween for producing a current flow such that electrons flow into one of said electrodes and out of the other and said charge compensating ions flow through said insulating electrolyte film from that one of said inorganic oxide counter electrode and said primary electrochromic film being oxidized to that one thereof being reduced for modulating said device between states of minimum and maximum transmission at said predetermined wavelength with the direction of transmission change being determined by the direction of current flow.

2. The device of claim 1 wherein one of said electrodes is a thin film transmissive at said predetermined wavelength and the other of said electrodes is reflective at said predetermined wavelength, wherein the reflectivity of said device may be modulated between a state of maximum reflectivity and a state of minimum reflectivity by controlling the absorption of said device with a potential applied between said first and second electrodes.

3. The device of claim 1 wherein said first and second electrodes are thin films transmissive at said predetermined wavelength, wherein the transmittance of said device may be controlled between a state of maximum transmittance and a state of minimum transmittance in response to a potential applied between said first and second electrodes.

4. A device in accordance with claim 1 wherein said primary electrochromic film is tungsten trioxide, said inorganic oxide counter electrode film is a mixture $(V_2O_5)_{1-x}(Nb_2O_5)_x$ $(x=0.01-0.99)$ prereduced with Li, said insulating electrolyte film is sputtered from a composite target of 42% $Li_2O$, 26% $SiO_2$ and 32% $ZrO_2$, said charge compensating ions are lithium, said first electrode is reflective aluminum, and said second electrode is transparent and tin-doped indium oxide on a substrate.

5. A device in accordance with claim 2 wherein said primary electrochromic film is tungsten trioxide, said inorganic oxide counter electrode film is a mixture $(V_2O_5)1-x(Nb_2O_5)x(x=0.01-0.99)$ prereduced with Li, said insulating electrolyte film is sputtered from a composite target of 42% $Li_2O$, 26% $SiO_2$ and 32% $ZrO_2$, said charge compensating ions are lithium, said first electrode is reflective aluminum, and said second electrode is transparent and tin-doped indium oxide on a substrate.

6. A device in accordance with claim 1 wherein said primary electrochromic film is tungsten trioxide, said inorganic oxide counter electrode film is a mixture $(V_2O_5)_{1-x}(Nb_2O_5)_x$ $(X=0.01-0.99)$ prereduced with Li, said insulating electrolyte film is sputtered from a composite target of 42% $Li_2O$, 26% $SiO_2$ and 32% $ZrO_2$, said charge compensating ions are lithium, said first electrode is reflective aluminum, and said second electrode is transparent and tin-doped indium oxide on a substrate, wherein the reflectance of said device may be controlled between a state of maximum transmittance and a state of minimum transmittance in response to a potential applied between said first and second electrodes.

7. A device in accordance with claim 1 wherein said first electrode comprises tin-doped indium oxide.

8. A device in accordance with claim 1 wherein said primary electrochromic film is tungsten trioxide, said counter electrode is a mixture $(V_2O_5)1-x(Nb_2O_5)x$ $(x=0.01-0.99)$ prereduced with Li, said insulating electrolyte film is poly (bismethoxyethoxymethoxide) phosphazine doped with $LiCF_3SO_3$, and said first and second electrodes are tin-doped indium oxide deposited upon glass.

9. A device in accordance with claim 1 wherein said primary electrochromic film is tungsten trioxide, said counter electrode is a mixture $(V_2O_5)_{1-x}(Nb_2O_5)_x$ $(x=0.01-0.99)$ prereduced with Li, said insulating electrolyte film is poly(bismethoxyethoxymethoxide) phosphazine doped with $LiCF_3SO_3$, and said first and second electrodes are tin-doped indium oxide deposited upon glass, wherein one of said electrodes is a thin film transmissive at said predetermined wavelength and the other of said electrodes is reflective at said predetermined wavelength, wherein the reflectivity of said device may be modulated between a state of maximum reflectivity and a state of minimum reflectivity by controlling the adsorption of said device with a potential applied between said first and second electrodes.

10. A device in accordance with claim 3 wherein said primary electrochromic film is tungsten trioxide,
said counter electrode is a mixture $(V_2O_5)_{1-x}(Nb_2O_5)_x$ $(x=0.01-0.99)$ prereduced with Li,
said insulating electrolyte film is poly (bismethoxyethoxymethoxide) phosphazine doped with LiCF$_3$SO$_3$,
and said first and second electrodes are tin-doped indium oxide deposited upon glass.

11. A device in accordance with claim 1 wherein said primary electrochromic film is tungsten trioxide,
said counter electrode is a mixture $(V_2O_5)_{1-x}(Nb_2O_5)_x$ $(x=0.01-0.99)$ prereduced with Li,
said insulating electrolyte film is poly (bismethoxyethoxymethoxide) phosphazine doped with LiCF$_3$SO$_3$,
and one of said electrodes is tin-doped indium oxide deposited onto glass and the other of said electrodes is a reflective aluminum film on glass.

12. A device in accordance with claim 2 wherein said primary electrochromic film is tungsten trioxide,
said counter electrode is a mixture $(V_2O_5)_{1-x}(Nb_2O_5)_x$ $(x=0.01-0.99)$ prereduced with Li,
said insulating electrolyte film is poly (bismethoxyethoxymethoxide) phosphazine doped with LiCF$_3$SO$_3$,
and one of said electrodes is tin-doped indium oxide deposited onto glass and the other of said electrodes is a reflective aluminum film on glass.

13. A device in accordance with claim 1 wherein said primary electrochromic film is tungsten trioxide,
said counter electrode is a mixture $(V_2O_5)_{1-x}(Nb_2O_5)_x$ $(x=0.01-0.99)$ prereduced with Li,
said insulating electrolyte film is poly(bismethoxyethoxymethoxide) phosphazine doped with LiCF$_3$SO$_3$,
and one of said electrodes is tin-doped indium oxide deposited onto glass and the other of said electrodes is a reflective aluminum film on glass,
wherein the reflectance of said device may be controlled between a state of maximum transmittance and a state of minimum transmittance in response to a potential applied between said first and second electrodes.

* * * * *